April 14, 1942.  F. A. NIEMANN  2,279,337

NUMERAL WHEEL

Filed July 9, 1938

INVENTOR.
Frederick A. Niemann
BY Charles B. Rasmussen
ATTORNEY.

Patented Apr. 14, 1942

2,279,337

UNITED STATES PATENT OFFICE 2,279,337

NUMERAL WHEEL

Frederick A. Niemann, Chicago, Ill., assignor to Felt & Tarrant Mfg. Co., Chicago, Ill., a corporation of Illinois Application July 9, 1938, Serial No. 218,423

6 Claims. (Cl. 235—1)

This invention relates in general to numeral wheels, and has more particular reference to numeral wheels which are adapted for use in registers or the like.

A principal object of the invention is the provision of a numeral wheel or registering device which is made of any extremely light-weight material, so that the power required to actuate the same will be reduced to a minimum.

Light-weight material, such as aluminum, which is adapted to be used to attain the desired results does not permit of riveting or welding in its construction.

Another important object of the invention, therefore, is the provision of a numeral wheel in which the various light-weight parts have interengaging means which cooperate to insure the proper relative positioning thereof, and in which another part is adapted to engage and rigidly secure said first parts together to form a unitary assemblage.

Numerous other objects and advantages of the invention will be apparent as it is better understood from the following description, which, when taken in connection with the accompanying drawing, discloses a preferred embodiment thereof.

Figure 1:
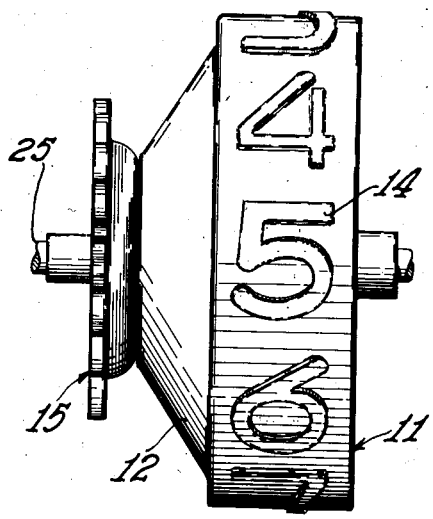
Figure 1 is a side elevational view of a numeral wheel embodying the features of my invention.

Referring more particularly to the drawing, reference character 11 indicates generally a cylindrical member or drum of any suitable light-weight metal, preferably aluminum. One end of this cylindrical member is provided with a flange 12. Formed in the smaller or inner portion of the flange 12 are a plurality of apertures 13, (Figs. 3 and 4) one of which apertures is slightly larger in diameter than the others for a purpose to be later described. A plurality of numerals 14 are embossed in the outer periphery of the cylindrical portion of the member 11.

Figure 2:
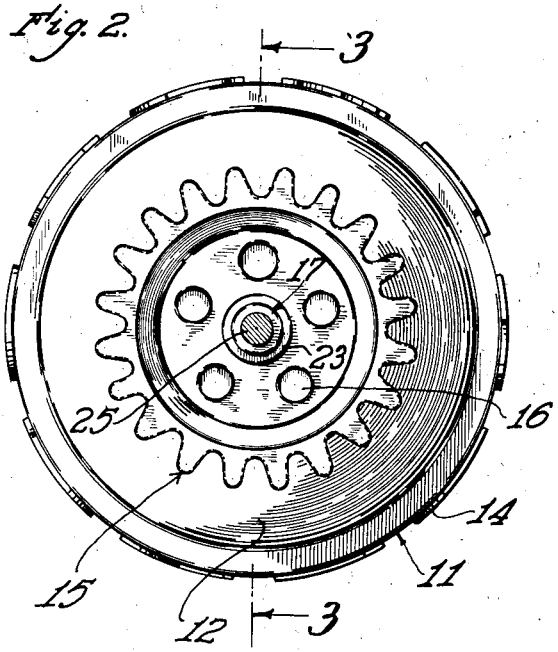
Figure 2 is an elevational view of the numeral wheel shown in Fig. 1, taken from the left side thereof.

A gear member, indicated generally by reference character 15, is adapted to be positioned directly adjacent the smaller end of the flange 12, and is provided with a plurality of small protuberances 16 on a face offset but parallel to the principal plane extending through the gear teeth, and (Figs. 2 and 3) which protuberances coincide with the apertures 13 and engage therein, one of said protuberances being slightly larger than the remaining protuberances to coincide with the larger aperture heretofore mentioned.

A hollow hub member 17, having a disk portion 18 and a bearing portion 19, is adapted to rigidly secure the member 11 and the gear 15 together, the disk 18 being positioned in contact with the inner surface of the smaller end of the flange 12, and the bearing portion 19 being inserted through a centrally located aperture 21 in the flange 12 of the member 11 and a similar aperture 22 in the gear 15. The several parts are rigidly secured together to form a unitary assemblage by upsetting the end of the bearing portion 19 against the outer surface of the gear 15, as shown at 23 in Fig. 3.

Figure 3:
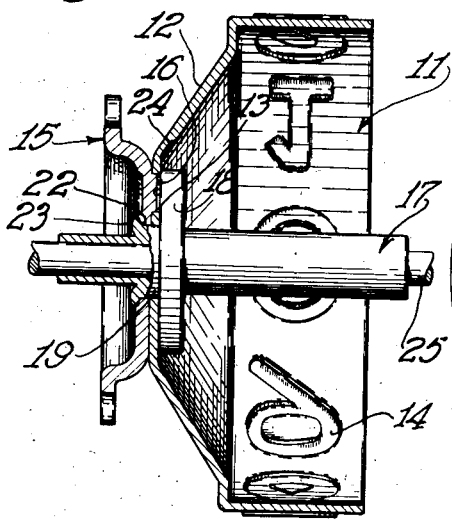
Figure 3 is a sectional view taken substantially on the line 3—3 of Fig. 2.

The steps of manufacture are as follows: The member 11, being made of a light-weight and ductile metal, may be easily shaped as shown in Figs. 1 and 3. The flange 12 is first formed on the member 11, and the numerals 14 are then embossed in the outer periphery of the cylindrical portion of the member 11 by means of suitable dies or the like. It will be understood, of course, that various types of inscription, other than digital numerals, may be used if desired.

Figure 4:
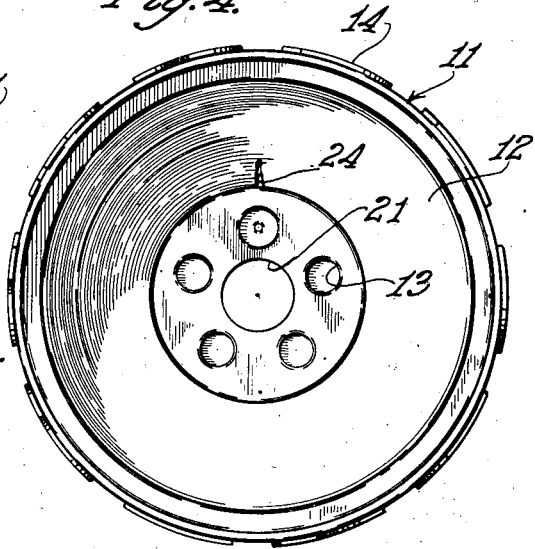
Figure 4 is an elevational view taken from the opposite side of the view shown in Fig. 2, with the hub member removed.

In the same operation of forming the flange 12, the apertures 13 are also formed, and a slight indentation 24 is provided on the inner surface of the flange 12 (Fig. 4). This indentation 24 is adjacent the larger aperture 13 (the upper one in Fig. 4), so that this aperture may be easily visually identified. The gear 15 is then positioned directly adjacent the member 11 with the protuberances 16 disposed within the apertures 13, the larger protuberance, which is the upper one in Fig. 2, fitting the larger aperture. This arrangement insures that the gear 15 will always assume the correct position relative to the member 11. The hub portion 17 is then inserted with the bearing member 19 extending through the aperture 21 of the member 11 and the aperture 22 of the gear 15, and the disk 18 abutting against the inner surface of the flange 12. Pressure is then exerted upon the member 19 causing the lip portion 23 to be formed.

In order that the member 11, upon which the numerals 14 are embossed, may be colored, the following steps are followed: The member 11 is first immersed in a solution and given a treatment commonly known as the "anodic treatment." It is then immersed in another solution containing the color desired until the entire surface is coated. After the color is formed, a resist is applied to the member 11. The member is then placed in a lathe and the color and resist is removed from the embossed numerals 14. The member 11 is then placed in a differently colored solution, and this second color will adhere to the numerals 14 but will not adhere to the portion of the member 11 already colored, due to the resist that was applied to the member which prevents any other color from adhering. Thus a novel combination of colors may be had, with the result that the numerals 14 may always be easily distinguishable. By using this method of treatment, greater economy is insured by reason of little or no loss or waste of material in the operations involved.

Heretofore, the numeral wheels in use were composed of a cylindrical member of hard rubber, or like material, and the numerals were die cut or otherwise formed in the outer periphery, and the color then applied. A steel disk was then fastened to the cylindrical member in any well-known manner, and the gear member then attached to the steel disk and held in place by spot welding, or the like. A great deal of difficulty was experienced in assembling these parts so that the gear would always have the same relationship with the numerals on the cylinder. The steps involved in the manufacture of this type of numeral wheel are greatly in excess of those required in the instant construction, and the amount of waste, due to imperfectly formed wheels, etc., was much greater than can possibly occur in applicant's construction and method of assembling the parts.

From the foregoing description it will be apparent that a novel and light-weight numeral wheel is provided herein, and that the cost of manufacture is greatly reduced. The apertures 13 and protuberances 16 insure accurate and proper positioning of the drum 12 and the gear 15 relative to each other, which is essential to an operative structure. After the end 23 of the bearing portion 19 of the hub 17 has been upset, the apertures 13 and protuberances 16 will prevent any relative rotational movement between the gear 15 and the drum 12. The unitary numeral wheel assemblage thus provided is adapted to be rotatably mounted upon a suitable supporting shaft 25.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A numeral wheel, comprising a cylindrical member having a flange portion, a plurality of apertures formed in said flange, a gear having a plurality of protuberances on one side wall thereof and disposed in the apertures in said flange, and a hub member rigidly securing said cylindrical member and said gear member together to form a unitary assemblage.

2. A numeral wheel adapted to be used in registers or the like, comprising a cylindrical member having one end shaped as a substantially radially disposed flange, the inner portion of said flange having a plurality of apertures formed therein, a gear member having a plurality of protuberances in one side thereof coinciding with said apertures in said flange, and a hub member having an enlarged disc portion disposed adjacent the inner surface of said flange and another portion upset against said gear member securing all of said members together to form an integral unit.

3. A numeral wheel adapted for use in registers or the like, comprising a cylindrical member having a substantially radially disposed flange at one end with a plurality of apertures formed therein, one of said apertures being slightly larger than the others, a gear member having a plurality of protuberances in one side thereof, one of said protuberances being slightly larger than the remaining protuberances, said gear and said cylindrical member being placed adjacent each other with the larger protuberance coinciding with the larger aperture, and a hub member rigidly securing said gear member and said cylindrical member together.

4. A numeral wheel, or the like, comprising a numeral bearing member of relatively light-weight material having a substantially radial flange, a gear having a substantially radial flange, one of said flanges being provided with circumferentially spaced protuberances, and the other of said flanges having circumferentially spaced recesses receiving said protuberances for properly positioning said numeral bearing member and said gear circumferentially relative to each other and for preventing relative rotative movement thereof, and a hub member forming a bearing portion for said numeral wheel and having substantially radial flange portions rigidly securing the flanges of said numeral bearing member and said gear therebetween to prevent relative axial displacement thereof.

5. A numeral wheel, comprising a member the periphery of which has numerals thereon, said member having an end portion, said end portion having a plurality of apertures formed therein, a gear disposed in abutting relation to said end portion, said gear having a plurality of protuberances complementary to said apertures and engaged therein, and a hub structure rigidly securing said member and said gear together to form a unitary assemblage.

6. A numeral wheel, comprising a cylindrical member the periphery of which has numerals thereon, said cylindrical member having a side face disposed at right angles to the axis of said cylindrical member, said side face having a plurality of apertures formed therein, a gear member having a face offset but parallel to its principal plane, said gear face having a plurality of protuberances complementary to said apertures and engaged therein, and a hub member having substantially radial flange portions spaced longitudinally of the hub and securing the side face of said cylindrical member and said gear face therebetween to form a unitary assemblage adapted to be rotatably mounted as such upon a supporting shaft.

FREDERICK A. NIEMANN.